(12) United States Patent
Kim et al.

(10) Patent No.: US 10,061,014 B2
(45) Date of Patent: Aug. 28, 2018

(54) RADAR SIGNAL PROCESSING METHOD AND APPARATUS FOR COMPENSATING FOR IN-PHASE/QUADRATURE-PHASE (I/Q) IMBALANCE

(71) Applicant: DAEGU GYEONGBUK INSTITUTE OF SCIENCE AND TECHNOLOGY, Daegu (KR)

(72) Inventors: Sang Dong Kim, Daegu (KR); Dae Gun Oh, Daegu (KR); Jong Hun Lee, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 447 days.

(21) Appl. No.: 14/822,729

(22) Filed: Aug. 10, 2015

(65) Prior Publication Data

US 2016/0139247 A1    May 19, 2016

(30) Foreign Application Priority Data

Nov. 18, 2014  (KR) ........................ 10-2014-0161162

(51) Int. Cl.
  *G01S 7/35*  (2006.01)
  *G01S 7/40*  (2006.01)
  *G01S 13/34*  (2006.01)

(52) U.S. Cl.
  CPC ............ *G01S 7/352* (2013.01); *G01S 7/4021* (2013.01); *G01S 13/34* (2013.01); *G01S 2007/358* (2013.01)

(58) Field of Classification Search
  CPC ........ G01S 7/352; G01S 7/4021; G01S 13/34; G01S 2007/358
  See application file for complete search history.

(56) References Cited

U.S. PATENT DOCUMENTS

| | | | | |
|---|---|---|---|---|
| 3,950,750 A | * | 4/1976 | Churchill ................. | G01S 7/40 342/174 |
| 4,003,054 A | * | 1/1977 | Goldstone ............. | G01S 7/4021 342/174 |
| 5,105,195 A | * | 4/1992 | Conrad ................. | G01S 7/4021 342/174 |
| 5,150,128 A | * | 9/1992 | Kongelbeck ........... | G01R 25/00 342/102 |

(Continued)

FOREIGN PATENT DOCUMENTS

| | | |
|---|---|---|
| JP | 2013-118530 A | 6/2013 |
| JP | 2013-137268 A | 7/2013 |

*Primary Examiner* — Peter M Bythrow
(74) *Attorney, Agent, or Firm* — McDermott Will & Emery LLP

(57) ABSTRACT

Provided is a radar signal processing method and apparatus for compensating for an in-phase/quadrature-phase (I/Q) imbalance, the method including extracting a real part of a radar signal in which an I/Q imbalance occurs through a conversion of an in-phase (I) channel signal of the radar signal, extracting an imaginary part of the radar signal through a conversion of a quadrature-phase (Q) channel signal of the radar signal, extracting an error due to the I/Q imbalance based on the real part and the imaginary part, and outputting a correction signal obtained by compensating for the I/Q imbalance of the radar signal based on the error.

19 Claims, 6 Drawing Sheets

(56) References Cited

U.S. PATENT DOCUMENTS

| | | | | |
|---|---|---|---|---|
| 5,209,237 A * | 5/1993 | Rosenthal | G06K 9/0051 | |
| | | | 367/45 | |
| 5,369,411 A * | 11/1994 | Lisle, Jr. | G01S 7/4021 | |
| | | | 342/151 | |
| 5,872,538 A * | 2/1999 | Fowler | G01S 7/4021 | |
| | | | 342/194 | |
| 6,825,800 B1 * | 11/2004 | Dudley | G01S 7/282 | |
| | | | 342/194 | |
| 6,828,933 B1 * | 12/2004 | Doerry | G01S 7/282 | |
| | | | 342/194 | |
| 6,836,240 B1 * | 12/2004 | Dubbert | G01S 7/282 | |
| | | | 342/194 | |
| 7,167,513 B2 * | 1/2007 | Tsui | H04L 25/03159 | |
| | | | 333/18 | |
| 7,313,203 B2 * | 12/2007 | Tubbax | H04L 25/022 | |
| | | | 375/316 | |
| 7,649,934 B2 * | 1/2010 | Su | H04L 27/364 | |
| | | | 375/235 | |
| 7,672,656 B2 * | 3/2010 | Husted | H04L 27/3863 | |
| | | | 375/345 | |
| 8,203,485 B2 * | 6/2012 | Shirakawa | G01S 3/74 | |
| | | | 342/417 | |
| 8,218,687 B2 * | 7/2012 | Sayers | H03D 3/009 | |
| | | | 329/318 | |
| 8,466,830 B2 * | 6/2013 | Kanamoto | G01S 3/74 | |
| | | | 342/107 | |
| 8,847,815 B2 * | 9/2014 | Kanamoto | G01S 3/74 | |
| | | | 342/118 | |
| 8,976,914 B2 * | 3/2015 | Viswanathan | H03D 3/009 | |
| | | | 375/316 | |
| 9,411,035 B2 * | 8/2016 | Tsai | G01S 3/74 | |
| 2003/0072393 A1 * | 4/2003 | Gu | H03C 3/40 | |
| | | | 375/322 | |
| 2003/0206603 A1 * | 11/2003 | Husted | H04L 27/3863 | |
| | | | 375/324 | |
| 2004/0028123 A1 * | 2/2004 | Sugar | H04L 1/1664 | |
| | | | 375/224 | |
| 2008/0159442 A1 * | 7/2008 | Tanabe | H04L 27/3863 | |
| | | | 375/324 | |
| 2009/0073026 A1 * | 3/2009 | Nakagawa | G01S 3/74 | |
| | | | 342/107 | |
| 2011/0193740 A1 * | 8/2011 | Kanamoto | G01S 3/74 | |
| | | | 342/158 | |
| 2012/0200453 A1 * | 8/2012 | Brosche | G01S 7/288 | |
| | | | 342/175 | |
| 2014/0111367 A1 * | 4/2014 | Kishigami | G01S 7/2813 | |
| | | | 342/21 | |
| 2014/0270002 A1 * | 9/2014 | Schubert | H04L 1/0045 | |
| | | | 375/320 | |
| 2015/0030103 A1 * | 1/2015 | Hormis | H04L 1/243 | |
| | | | 375/296 | |

* cited by examiner

RADAR SIGNAL PROCESSING METHOD AND APPARATUS FOR COMPENSATING FOR IN-PHASE/QUADRATURE-PHASE (I/Q) IMBALANCE

CROSS-REFERENCE TO RELATED APPLICATION

This application claims the priority benefit of Korean Patent Application No. 10-2014-0161162, filed on Nov. 18, 2014, in the Korean Intellectual Property Office, the disclosure of which is incorporated herein by reference.

BACKGROUND

1. Field of the Invention

Example embodiments of the present invention relate to a method and apparatus for processing a radar signal in which an in-phase/quadrature-phase (I/Q) imbalance occurs and, more particularly, to a radar signal processing method apparatus for processing a radar signal in which the I/Q imbalance occurs.

2. Description of the Related Art

A frequency modulation continuous wave (FMCW) radar may transmit a linear frequency modulation radar signal, receive a signal generated based on the transmitted linear frequency modulation radar signal reflected from an object to be detected, estimate a Doppler frequency between the transmitted linear frequency modulation radar signal and the received signal, and detect a speed of the object and a distance from the object.

In general, the FMCW radar may apply a high precision algorithm such as a multiple signal classification (MUSIC) and an estimation of signal parameters via rotational invariance techniques (ESPRIT) to enhance a Doppler frequency estimation performance. The high precision algorithm for use in the FMCW radar may be susceptible to a signal phase. In this example, a phase difference between an in-phase (I) channel and a quadrature-phase (Q) channel of a radar signal received by the FMCW radar may be 90°. In practice, the phase difference may vary based on numerous factors. For this reason, an in-phase/quadrature-phase (I/Q) imbalance may occur in the radar signal received by the FMCW radar.

Since the high precision algorithm is susceptible for a signal phase, an error may occur while detecting an object when the I/Q imbalance occurs.

Accordingly, there is desire for a method of processing an error due to an I/Q imbalance occurring in a radar signal received by a radar signal.

SUMMARY

An aspect of the present invention provides a method and apparatus for correcting an error due to an in-phase/quadrature-phase (I/Q) imbalance occurring in a radar signal, thereby enhancing accuracy of a parameter for use in object detection.

According to an aspect of the present invention, there is provided a radar signal processing method including extracting a real part of a radar signal in which an I/Q imbalance occurs through a conversion of an in-phase (I) channel signal of the radar signal, extracting an imaginary part of the radar signal through a conversion of a quadrature-phase (Q) channel signal of the radar signal, extracting an error due to the I/Q imbalance based on the real part and the imaginary part, and outputting a correction signal obtained by compensating for the I/Q imbalance of the radar signal based on the error.

The extracting of the real part may include performing a discrete Fourier transform (DFT) on the I channel signal, determining a spectrum of the I channel signal based on a DFT result of the I channel signal, and extracting the real part based on an inverse DFT result of the spectrum of the I channel signal.

The extracting of the imaginary part may include performing a DFT on the Q channel signal, determining a spectrum of the Q channel signal based on a DFT result of the Q channel signal, and extracting the imaginary part based on an inverse DFT result of the spectrum of the Q channel signal.

The outputting may include outputting a Q channel of the correction signal based on the error and the imaginary part, and outputting an I channel of the correction signal based on the real part.

The radar signal may be a signal generated based on a radar signal reflected from an object and filtered using at least one of a dechirping filter and a low pass filter.

According to another aspect of the present invention, there is also provided a radar signal processing method including receiving a radar signal reflected from an object, outputting a correction signal obtained by compensating for an I/Q imbalance in the radar signal, and detecting the object from which the radar signal is reflected based on the correction signal.

The outputting may include extracting a real part of the radar signal through a conversion of an I channel of the radar signal in response to the I/Q imbalance occurring in the radar signal, extracting an imaginary part of the radar signal through a conversion of a Q channel of the radar signal, extracting an error due to the I/Q imbalance based on the real part and the imaginary part, and generating the correction signal obtained by compensating for the I/Q imbalance in the radar signal based on the error.

The extracting of the real part may include performing a DFT on the I channel signal, determining a spectrum of the I channel signal based on a DFT result of the I channel signal, and extracting the real part based on an inverse DFT result of the spectrum of the I channel signal.

The extracting of the imaginary part may include performing a DFT on the Q channel signal, determining a spectrum of the Q channel signal based on a DFT result of the Q channel signal, and extracting the imaginary part based on an inverse DFT result of the spectrum of the Q channel signal.

The outputting may include outputting a Q channel of the correction signal based on the error and the imaginary part, and outputting an I channel of the correction signal based on the real part.

The detecting may include defining an auto-correlation matrix based on the correction signal, extracting a signal eigenvector matrix by applying an eigenvalue decomposition (EVD) to the auto-correlation matrix, defining a signal sub-matrix based on the signal eigenvector matrix, estimating a delay path of the radar signal based on the signal sub-matrix, and detecting the object from which the radar signal is reflected based on the delay path.

According to still another aspect of the present invention, there is also provided a radar signal processing apparatus including a real part extractor configured to extract a real part of a radar signal in which an I/Q imbalance occurs through a conversion of an I channel signal of the radar signal, an imaginary part extractor configured to extract an imaginary part of the radar signal through a conversion of a Q channel signal of the radar signal, an error extractor configured to extract an error due to the I/Q imbalance based on the real part and the imaginary part, and a correction signal outputter configured to output a correction signal obtained by compensating for the I/Q imbalance of the radar signal based on the error.

The real time extractor may be configured to perform a DFT on the I channel signal, determine a spectrum of the I channel signal based on a DFT result of the I channel signal, and extract the real part based on an inverse DFT result of the spectrum of the I channel signal.

The imaginary part extractor may be configured to perform a DFT on the Q channel signal, determine a spectrum of the Q channel signal based on a DFT result of the Q channel signal, and extract the imaginary part based on an inverse DFT result of the spectrum of the Q channel signal.

The correction signal outputter may be configured to output a Q channel of the correction signal based on the error and the imaginary part and output an I channel of the correction signal based on the real part.

The radar signal may be a signal generated based on a radar signal reflected from an object and filtered using at least one of a dechirping filter and a low pass filter.

According to yet another aspect of the present invention, there is also provided a radar signal processing apparatus including a receiver configured to receive a radar signal reflected from an object, a correction signal outputter configured to output a correction signal obtained by compensating for an I/Q imbalance in the radar signal, and an object detector configured to detect the object from which the radar signal is reflected based on the correction signal.

The correction signal outputter may include a real part extractor configured to extract a real part of the radar signal through a conversion of an I channel of the radar signal in response to the I/Q imbalance occurring in the radar signal, an imaginary part extractor configured to extract an imaginary part of the radar signal through a conversion of a Q channel of the radar signal, an error extractor configured to extract an error due to the I/Q imbalance based on the real part and the imaginary part, and a correction signal outputter configured to output the correction signal obtained by compensating for the I/Q imbalance in the radar signal based on the error.

The real part extractor may be configured to perform a DFT on the I channel signal, determine a spectrum of the I channel signal based on a DFT result of the I channel signal, and extract the real part based on an inverse DFT result of the spectrum of the I channel signal.

The imaginary part extractor may be configured to perform a DFT on the Q channel signal, determine a spectrum of the Q channel signal based on a DFT result of the Q channel signal, and extract the imaginary part based on an inverse DFT result of the spectrum of the Q channel signal.

The correction signal outputter may be configured to output a Q channel of the correction signal based on the error and the imaginary part and output an I channel of the correction signal based on the real part.

The object detector may be configured to define an auto-correlation matrix based on the correction signal, extract a signal eigenvector matrix by applying an EVD to the auto-correlation matrix, define a signal sub-matrix based on the signal eigenvector matrix, estimate a delay path of the radar signal based on the signal sub-matrix, and detect the object from which the radar signal is reflected based on the delay path.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
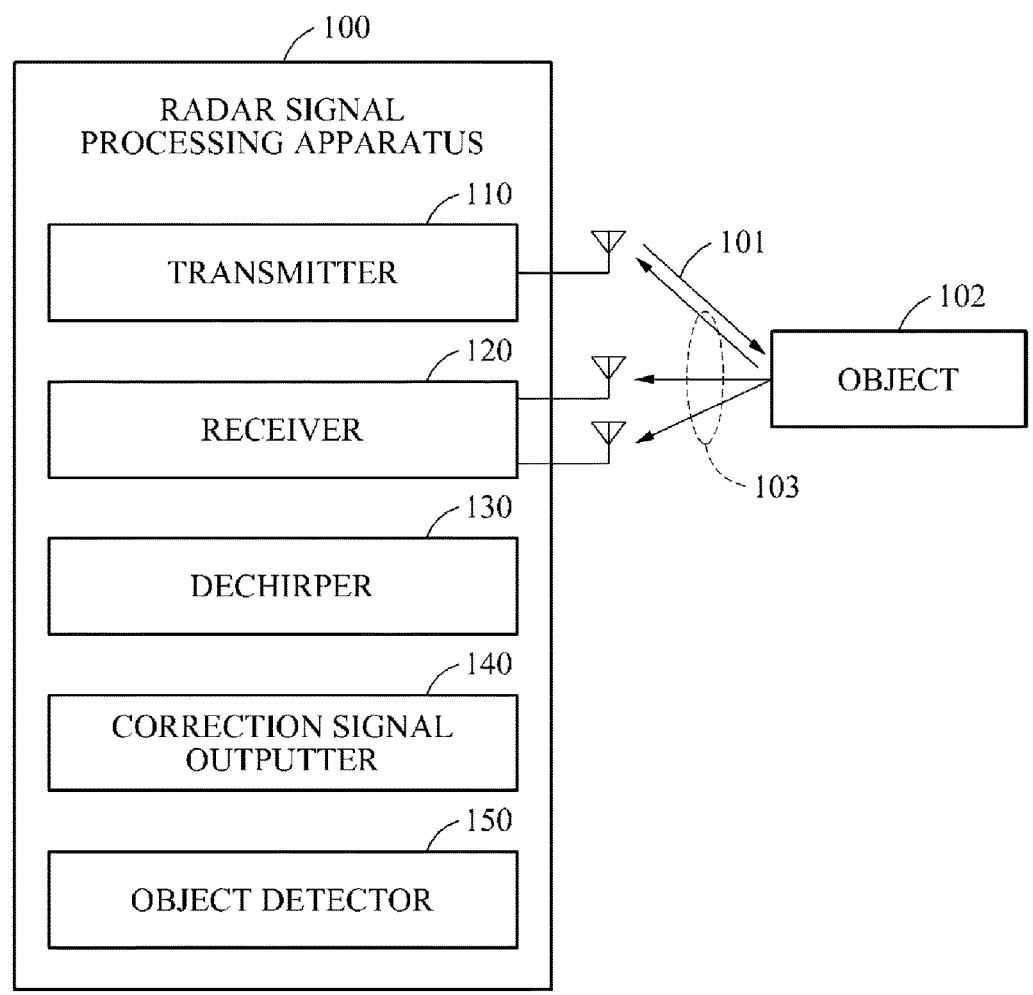
FIG. 1 is a diagram illustrating a radar signal processing apparatus according to an example embodiment of the present invention.

Reference will now be made in detail to exemplary embodiments of the present invention, examples of which are illustrated in the accompanying drawings, wherein like reference numerals refer to the like elements throughout. A radar signal processing method according to example embodiments of the present invention may be performed by a radar signal processing apparatus.

FIG. 1 is a diagram illustrating a radar signal processing apparatus 100 according to an example embodiment of the present invention.

Referring to FIG. 1, the radar signal processing apparatus 100 may include a transmitter 110, a receiver 120, a dechirper 130, a correction signal outputter 140, and an object detector 150.

The transmitter 110 may transmit a radar signal 101 through a transmission antenna. In this example, the transmitter 110 may transmit, as the radar signal 101, a chirp signal generated based on a frequency modulation continuous wave (FMCW) scheme.

As an example, a chirp signal s(t) transmitted as the radar signal 101 by the transmitter 110 may be expressed as shown in Equation 1.

$$s(t) = \begin{cases} \cos\left((\omega_c + w_s)t + \frac{\mu}{2}t^2\right) & \text{for } 0 \le t < T_{sym} \\ 0 & \text{elsewhere} \end{cases} \quad \text{[Equation 1]}$$

In Equation 1, $\omega_c$ denotes a carrier wave frequency, and $\omega_s$ denotes an initial frequency. Also, $\mu$ denotes an instantaneous frequency variation of a chirp symbol, and $T_{sym}$ denotes a signal period of the chirp symbol.

The receiver 120 may receive a radar signal 103 generated based on the radar signal 101 reflected from an object 102 through a reception antenna.

As an example, when a channel is not temporally changed during $T_{sym}$, y(t) may be expressed as shown in Equation 2.

In this example, y(t) may correspond to a radar signal 103 including additive white Gaussian noise (AWGN).

$$y(t) = as(t-\tau) + \omega(t), \qquad \text{[Equation 2]}$$

In Equation 2, $\omega(t)$ denotes AWGN including noise power $\sigma_2$, a denotes a complex amplitude for each channel, and $\tau$ denotes a delay for each channel.

The radar signal 103 received by the receiver 120 may be a radar signal in which an in-phase/quadrature-phase (I/Q) imbalance occurs, and may also be a radar signal in which the I/Q imbalance does not occur.

The dechirper 130 may filter the radar signal 103 received by the receiver 120 using at least one of a dechirping filter and a low pass filter.

When the radar signal 103 corresponds to the radar signal in which the I/Q imbalance does not occur, a signal d(t) may be defined as shown in Equation 3. The signal d(t) may indicate a signal generated based on the radar signal 103, for example, y(t), filtered by the dechirper 130 using the dechirping filter.

$$d(t) = y(t) \times r^*(t) \qquad \text{[Equation 3]}$$

In Equation 3, r(t) denotes a reference chirp signal. The reference chirp signal may be, for example, a signal generated by converting the chirp signal s(t) to be an index form. Also, * denotes a complex conjugate.

Additionally, when the dechirper 130 filters the signal d(t) defined in Equation 3 using the low pass filter, the filtered signal d(t) may include a sine component as shown in Equation 4.

$$d(t) = a\, \exp\left[j\left(-\mu\tau t - \omega_s \tau + \frac{\mu}{2}\tau^2\right)\right] \qquad \text{[Equation 4]}$$

In Equation 4, a delay parameter $\tau$ may be changed to a frequency having a single tone sine component and thus, the object detector 150 may estimate a frequency of the filtered signal d(t), thereby estimating a delay parameter of the radar signal 103. The object detector 150 may detect an object based on the estimated delay parameter.

When the radar signal 103 corresponds to the radar signal in which the I/Q imbalance occurs, an I/Q imbalance reference chirp signal r'(t) may be defined to analyze converted signals in response to an occurrence of the I/Q imbalance. As an example, the I/Q imbalance reference chirp signal r'(t) may be expressed as shown in Equation 5.

$$r'(t) = \cos(X) + j(1+\beta)\sin(X+\theta) \qquad \text{[Equation 5]}$$

In this example, X may be defined as shown in Equation 6. Also, $\theta$ denotes a phase affected by the I/Q imbalance, and $\beta$ denotes an amplitude error affected by the I/Q imbalance.

$$X = (\omega_c + \omega_s)t + \mu/2 t^2 \qquad \text{[Equation 6]}$$

In this example, Equation 3 may be changed as shown in Equation 7.

$$(r'(t))^* = \xi^+ \exp^{jX} + \xi^- \exp^{-jX} \qquad \text{[Equation 7]}$$

In this example, $\xi^+$ may be defined as shown in Equation 8, and $\xi^-$ may be defined as shown in Equation 9.

$$\xi^+ = \tfrac{1}{2}\{1 - (1+\beta)e^{j\theta}\} \qquad \text{[Equation 8]}$$

$$\xi^- = \tfrac{1}{2}\{1 + (1+\beta)e^{-j\theta}\}. \qquad \text{[Equation 9]}$$

A converted signal $d_{IQ}(t)$ may be generated by the dechirper 130 by filtering the radar signal in which the I/Q imbalance occurs using the dechirping filter and the low pass filter. The converted signal $d_{IQ}(t)$ may be obtained based on Equation 10.

$$d_{IQ}(t) = \xi^- a\, \exp\left[j\left(-\mu\tau t - \omega_s \tau + \frac{\mu}{2}\tau^2\right)\right] + \xi^+ a\, \exp\left[j\left(\mu\tau t + \omega_s \tau - \frac{\mu}{2}\tau^2\right)\right] + \omega(t). \qquad \text{[Equation 10]}$$

For example, as shown in Equation 10, the converted signal $d_{IQ}(t)$ may be expressed as a sum of a signal on which complex scaling is performed and a signal in which interference occurs at an image frequency of a desired signal to be received.

When the radar signal 103 corresponds to the radar signal in which the I/Q imbalance occurs, the correction signal outputter 140 may process the converted signal $d_{IQ}(t)$ output from the dechirper 130, and output a correction signal obtained by compensating for the I/Q imbalance in the radar signal 103. Also, when the radar signal 103 corresponds to the radar signal in which the I/Q imbalance does not occurs, the object detector 150 may detect the object in response to an output of the dechirper 130 while the correction signal outputter 140 is not operating.

Figure 2:
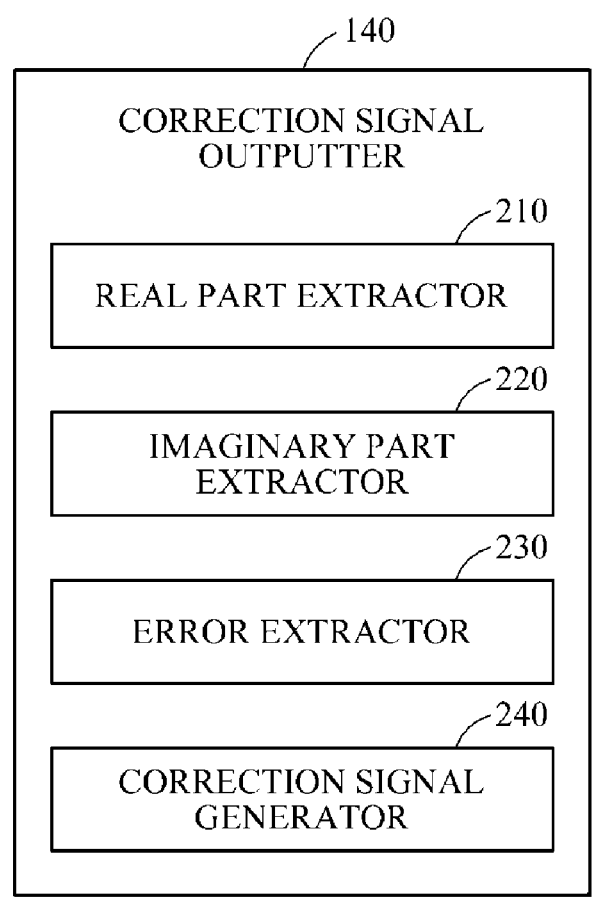
FIG. 2 is a block diagram illustrating a correction signal outputter according to an example embodiment of the present invention.

Descriptions related to configuration and operation of the correction signal outputter 140 will be provided in detail with reference to FIG. 2.

The object detector 150 may detect the object 102 from which the radar signal 101 is reflected, based on at least one of the correction signal output from the correction signal outputter 140 and the filtered signal output from the dechirper 130.

As an example, the object detector 150 may estimate a single tone frequency based on an estimation of signal parameter via rotational invariance technique (ESPRIT) in response to the correction signal, thereby detecting the object 102 from which the radar signal 101 is reflected.

The radar signal processing apparatus 100 may correct the error due to the I/Q imbalance occurring in the radar signal, thereby enhancing accuracy of a parameter for use in an object detection.

FIG. 2 is a block diagram illustrating a correction signal outputter according to an example embodiment of the present invention.

Referring to FIG. 2, the correction signal outputter 140 may include a real part extractor 210, an imaginary part extractor 220, an error extractor 230, and a correction signal generator 240.

When a Nyquist sampling frequency $f_s$ is $1/T_s$, a discrete time model of the converted signal $d_{IQ}(t)$ output from the dechirper 130 may be expressed as shown in Equation 11.

$$d_{IQ}[n] = \xi^- a\, \exp\left[j\left(-\mu\tau n T_s - \omega_s \tau + \frac{\mu}{2}\tau^2\right)\right] + \xi^+ a\, \exp\left[j\left(\mu\tau n T_s + \omega_s \tau - \frac{\mu}{2}\tau^2\right)\right] + \omega(nT_s) \text{ for } n = 0, \ldots, N-1. \qquad \text{[Equation 11]}$$

In Equation 11, $T_s$ denotes a sample period, N denotes a number of samples, and $N = T_{sym}/T_s$. Also, $\omega[nT_s]$ may denote noise.

The real part extractor 210 may extract a real part of a radar signal in which an I/Q imbalance occurs, through a conversion of an I channel signal of the radar signal. In this example, the radar signal in which the I/Q imbalance occurs may be, for example, the converted signal $d_{IQ}(t)$ output from the dechirper 130. Also, the real part extractor 210 may convert the I channel signal based on, for example, a Hilbert transform.

The real part extractor 210 may perform a discrete Fourier transform (DFT) on the I channel signal. As an example, the real part extractor 210 may perform an N-point DFT on an I channel signal of the converted signal $d_{IQ}(t)$ to express a result of the N-point DFT as shown in Equation 12.

$$D_{IQ}^{(real)}[k] = \sum_{n=0}^{N-1} d_{IQ,I}[n]e^{-\frac{2\pi kn}{N}}, k = 0, 1, \ldots, N-1 \quad \text{[Equation 12]}$$

In Equation 12, $D_{IQ}^{(real)}[k]$ may be a DFT result of a real part of the converted signal $d_{IQ}(t)$.

The real part extractor 210 may determine a spectrum of the I channel signal based on the DFT result of the I channel signal. As an example, a spectrum $F_{hilb}^{(real)}[n]$ of the I channel signal on which the DFT is performed may be expressed as shown in Equation 13. In this example, the spectrum of the I channel signal may be, for example, an N-point one-sided spectrum.

$$F_{hilb}^{(real)}[m] = \begin{cases} D_{IQ}^{(real)}[0], m = 0 \\ 2D_{IQ}^{(real)}[m], 1 \leq m \leq \frac{N}{2} - 1 \\ D_{IQ}^{(real)}\left[\frac{N}{2}\right], m = \frac{N}{2} \\ 0, \frac{N}{2} + 1 \leq m \leq N - 1 \end{cases} \quad \text{[Equation 13]}$$

The real part extractor 210 may extract the real part of the converted signal $d_{IQ}(t)$ based on an inverse DFT result of the spectrum of the I channel signal. As an example, based on the inverse DFT result of $F_{hilb}^{(real)}[n]$, the real part extractor 210 may determine a real part $f_{hilb}^{(real)}[k]$ of the converted signal $d_{IQ}(t)$ corresponding to a complex analysis signal, as shown in Equation 14.

$$f_{hilb}^{(real)}[k] = \sum_{n=0}^{N-1} F_{hilb}^{(real)}[n]e^{\frac{2\pi kn}{N}}, k = 0, 1, \ldots, N-1 \quad \text{[Equation 14]}$$

The imaginary part extractor 220 may extract an imaginary part of the converted signal $d_{IQ}(t)$ through a conversion of a Q channel signal of the converted signal $d_{IQ}(t)$. The imaginary part extractor 220 may convert the Q channel signal based on, for example, the Hilbert transform.

In this example, the imaginary part extractor 220 may perform the DFT on the Q channel signal. The imaginary part extractor 220 may determine a spectrum of the Q channel signal based on a DFT result of the Q channel signal. The imaginary part extractor 220 may extract the imaginary part of the converted signal $d_{IQ}(t)$ based on an inverse DFT result of the spectrum of the Q channel signal.

The error extractor 230 may extract an error due to the I/Q imbalance based on the real part extracted by the real part extractor 210 and the imaginary part extracted by the imaginary part extractor 220.

For example, the error extractor 230 may extract an error $f_{err}[k]$ due to the I/Q imbalance by multiplying a complex conjugate $f_{hilb}^{*(real)}[k]$ of the real part $f_{hilb}^{(real)}[k]$ extracted by the real part extractor 210 and the imaginary part $f_{hilb}^{(imag)}[K]$ extracted by the imaginary part extractor 220. As an example, the error $f_{err}[k]$ due to the I/Q imbalance may be expressed as shown in Equation 15.

$$f_{err}[k] = (1+\hat{\epsilon})e^{j\hat{\theta}} \quad \text{[Equation 15]}$$

The correction signal generator 240 may output a correction signal obtained by compensating for the I/Q imbalance of the radar signal 103 based on the error extracted by the error extractor 230.

In this example, the correction signal generator 240 may output a Q channel of the correction signal based on the error and the imaginary part. For example, the correction signal generator 240 may output an imaginary part $d_{comp,Q}[k]$ of a correction signal $d_{comp}[k]$ by multiplying the complex conjugate $f_{err}^*[k]$ of $f_{err}[k]$ and the imaginary part $f_{hilb}^{(imag)}[k]$ extracted by the imaginary part extractor 220. In this example, $d_{comp,Q}[k]$ may be a Q channel of the correction signal $d_{comp}[k]$.

Also, the correction signal generator 240 may output the I channel of the correction signal based on the real part. For example, the correction signal generator 240 may output a real part $d_{comp,I}[k]$ of the correction signal $d_{comp}[k]$ based on the real part $f_{hilb}^{(real)}[k]$ extracted by the real part extractor 210. In this example, $d_{comp,I}[k]$ may be the I channel of the correction signal $d_{comp}[k]$.

Figure 3:
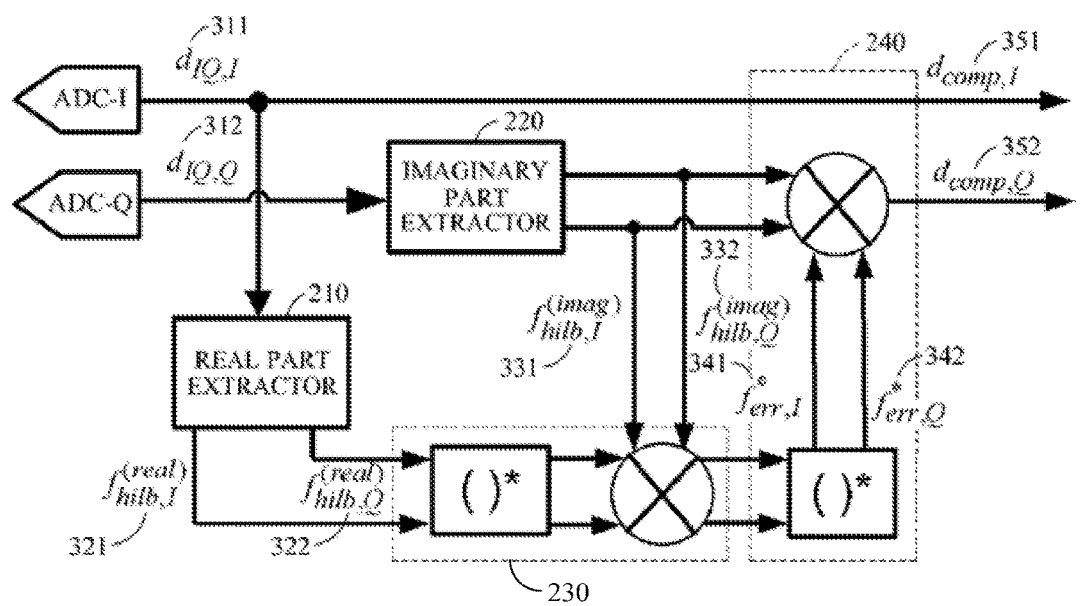
FIG. 3 is a diagram illustrating an example of operating a correction signal outputter according to an example embodiment of the present invention.

FIG. 3 is a diagram illustrating an example of operating a correction signal outputter according to an example embodiment of the present invention.

Referring to FIG. 3, the converted signal $d_{IQ}(t)$ output from the dechirper 130 may include an I channel signal 311, for example, $d_{IQ,I}$, and a Q channel signal 312, for example, $d_{IQ,Q}$.

In this example, the real part extractor 210 may extract a real part of the converted signal $d_{IQ}(t)$ from the I channel signal 311. The extracted real part may include an I channel 321, for example, $f_{hilb,I}^{(real)}$, and a Q channel 322, for example, $f_{hilb,Q}^{(real)}$, with reference to FIG. 3.

The imaginary part extractor 220 may extract an imaginary part of the converted signal $d_{IQ}(t)$ from the Q channel signal 312. In this example, the extracted imaginary part may include an I channel 331, for example, $f_{hilb,I}^{(imag)}$, and a Q channel 332, for example, $f_{hilb,Q}^{(imag)}$, with reference to FIG. 3.

The error extractor 230 may extract an error $f_{err}[k]$ by multiplying a conjugate complex of the I channel 321 and the Q channel 322 of the real part, and the I channel 331 and the Q channel 332 of the imaginary part with reference to FIG. 3.

The correction signal generator 240 may output an imaginary part 352, for example, $d_{comp,Q}[k]$ of a correction signal $d_{comp}[k]$ by multiplying a complex conjugate 341, for example, $f_{err,I}^*$, and a complex conjugate 342, for example, $f_{err,Q}^*$, of the error $f_{err}[k]$, and the I channel 331 and the Q channel 332 of the imaginary part.

The correction signal generator 240 may output the I channel signal 311 as a real part 351, for example, $d_{comp,I}[k]$, of the correction signal $d_{comp}[k]$.

Figure 4:
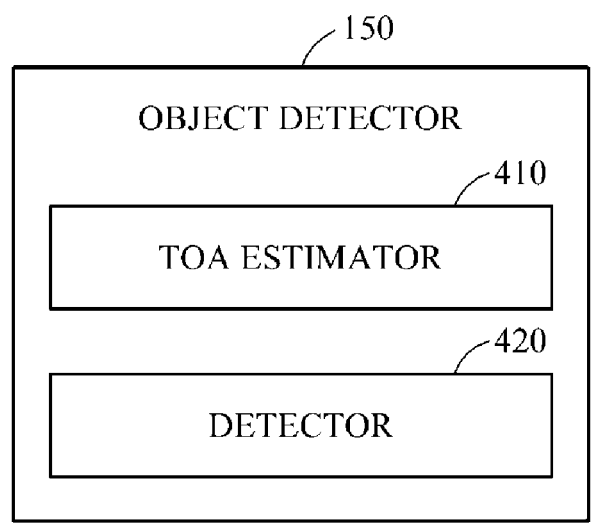
FIG. 4 is a block diagram illustrating an object detector according to an example embodiment of the present invention.

FIG. 4 is a block diagram illustrating an object detector according to an example embodiment of the present invention.

Referring to FIG. 4, the object detector 150 of FIG. 1 may include a time of arrival (TOA) estimator 410 and a detector 420.

The TOA estimator 410 may estimate a TOA of a radar signal 103 based on a correction signal output from the correction signal outputter 140.

The TOA estimator 410 may define an auto-correlation matrix based on the correction signal output from the correction signal outputter 140. As an example, the TOA estimator 410 may define an L×L auto-correlation matrix, for example, an auto-correlation matrix $R_{dd}$, based on a correction signal $d_{comp}[k]$ having N samples. For example, the TOA estimator 410 may define the auto-correlation matrix $R_{dd}$ as shown in Equation 16.

$$R_{dd} = \sum_{n=0}^{N-L} d_{comp,n} d_{comp,n}^H \quad \text{[Equation 16]}$$

In Equation 16, a sequence $d_{comp,n}=[d_{comp}[n], \ldots, d_{comp}[n+L-1]]$.

The TOA estimator 410 may extract a signal eigenvector matrix by applying an eigenvalue decomposition (EVD) to the defined auto-correlation matrix $R_{dd}$. As an example, the TOA estimator 410 may apply the EVD to the auto-correlation matrix $R_{dd}$ as shown in Equation 17.

$$R_{dd} = [S\ G] \begin{bmatrix} \lambda_0 & & \\ & \ddots & \\ & & \lambda_{L-1} \end{bmatrix} \begin{bmatrix} S^* \\ G^* \end{bmatrix} \quad \text{[Equation 18]}$$

In Equation 17, a signal eigenvector matrix S, for example, $S=[s_0| \ldots |s_{M-1}]$, may include M eigenvectors in a signal subspace area of a correlation matrix. Also, in a noise eigenvector matrix G, for example, $G=[g_0| \ldots |g_{L-M-1}]$, L–M eigenvectors may be included in a noise subspace area of the correlation matrix, and $\lambda_n$ denotes an $n^{th}$ eigenvalue of the correlation matrix. In this example, when M is a maximum value, eigenvalues $\lambda_M$ through $\lambda_{L-1}$ may correspond to the M eigenvectors of the signal eigenvector matrix S. Also, when M is less than the maximum value, the eigenvalues $\lambda_M$ through $\lambda_{L-1}$ may correspond to the eigenvectors of the noise eigenvector matrix G, for example, $\lambda_m = \ldots = \lambda_{L-1} = \sigma^2$.

The TOA estimator 410 may define a signal sun-matrix based on the extracted signal eigenvector matrix.

The TOA estimator 410 may define signal sub-matrixes $S_1$ and $S_2$ as shown in Equation 18.

$$S_1 = [I_{m-1}\ 0]S$$

$$S_2 = [0\ I_{m-1}]S \quad \text{[Equation 18]}$$

In this example, the signal sub-matrixes $S_1$ and $S_2$ may be factorized as shown in Equation 19.

$$S_1 = A_1 C \text{ and } S_2 = A_1 D C = S_1 \phi \quad \text{[Equation 19]}$$

In Equation 19, $A_1 = [I_{m-1}\ 0]A$, and $D = \text{diag}[\delta_0, \ldots, \delta_{M-1}]$. $\delta_m$ denotes a frequency of a sine component converted for an $m^{th}$ path, and $\delta_m = \mu \tau_m T_s$. Also, $\phi = C^{-1}DC$, and C may be an M×M non-singular transformation matrix.

Thus, $\phi$ may have an eigenvalue the same as that of D. As an example, the TOA estimator 410 may determine $\phi$ based on Equation 20.

$$\phi = s_1^* s_1)^{-1} s_1^* s_2$$

The TOA estimator 410 may estimate a path on which a radar signal is delayed based on the signal sub-matrix. As an example, the TOA estimator 410 may estimate a first delay path from among numbers included in $\phi$ based on Equation 21.

$$\hat{\tau}_1 = -\frac{1}{\mu T_s}\text{angle}(v_1) \quad \text{[Equation 21]}$$

In Equation 21, $v_1$ may be a first eigenvalue of $\phi$. Also, a path may be a reception antenna receiving a delayed signal, for example, the radar signal 103. For example, the radar signal 103 may be received by a top antenna with reference to FIG. 1. In this example, the TOA estimator 410 may estimate, as a delay path, a path through which the radar signal 103 reflected from the object 102 of the radar signal processing apparatus 100 reaches the top antenna.

The detector 420 may detect a position of an object based on the TOA estimated by the TOA estimator 410. For example, the detector 420 may detect an object from which a radar signal is reflected, based on the delay path estimated by the TOA estimator 410.

Figure 5:
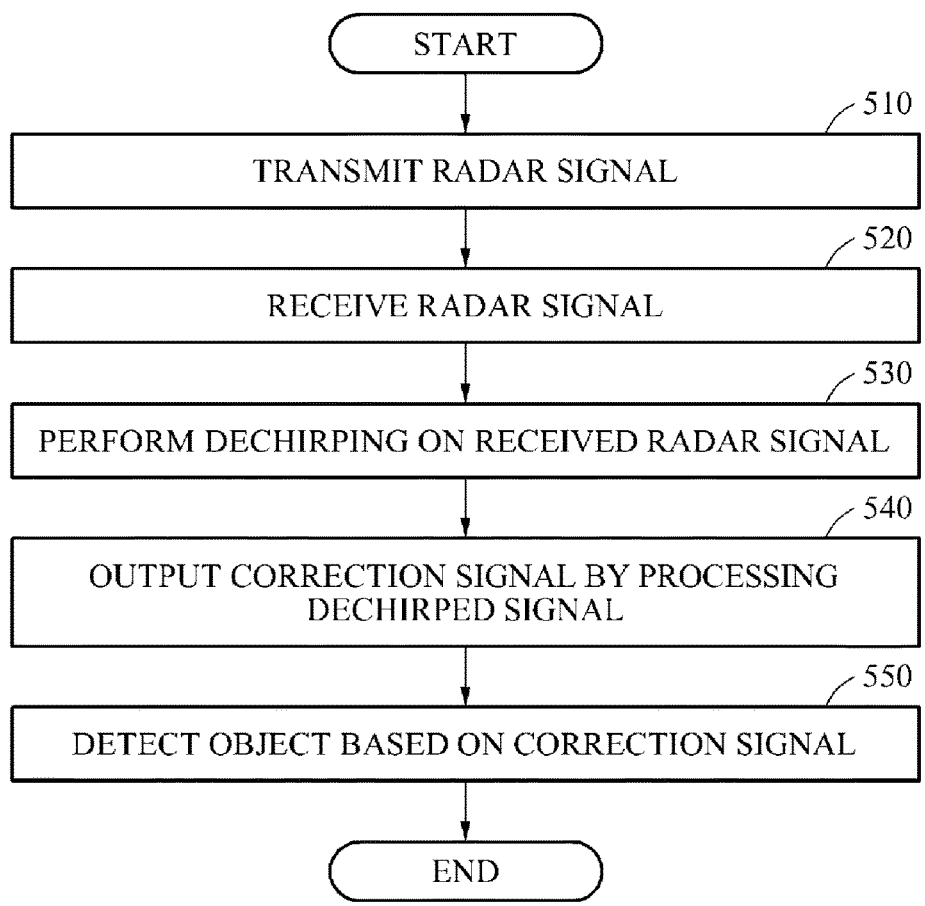
FIG. 5 is a flowchart illustrating a radar signal processing method according to an example embodiment of the present invention.

FIG. 5 is a flowchart illustrating a radar signal processing method according to an example embodiment of the present invention.

In operation 510, the transmitter 110 may transmit the radar signal 101 through a transmission antenna. In this example, the transmitter 110 may transmit a chirp signal as the radar signal 101.

In operation 520, the receiver 120 may receive the radar signal 103 generated based on the radar signal 101 transmitted in operation 510 and reflected from an object 102, through a reception antenna. In this example, the radar signal 103 received by the receiver 120 may be a radar signal in which an I/Q imbalance occurs, and may also be a radar signal in which the I/Q imbalance does not occur.

In operation 530, the dechirper 130 may output a converted signal $d_{IQ}(t)$ by filtering the radar signal 103 received in operation 520 using at least one of a dechirping filter and a low pass filter.

When the radar signal 103 corresponds to the radar signal in which the I/Q imbalance does not occur, operation 530 may not be performed.

In operation 540, the correction signal outputter 140 may output a correction signal obtained by compensating for the I/Q imbalance in the radar signal 103 received in operation 520 by processing the converted signal $d_{IQ}(t)$ output in operation 530.

In operation 550, the object detector 150 may detect the object 102 from which the radar signal 101 is reflected, based on at least one of the correction signal output in operation 540 and the converted signal $d_{IQ}(t)$. When the radar signal 103 corresponds to the radar signal in which the I/Q imbalance does not occur, the object detector 150 may detect the object 102 from which the radar signal 101 is reflected, based on the converted signal $d_{IQ}(t)$. When the radar signal 103 corresponds to the radar signal in which the I/Q imbalance occurs, the object detector 150 may detect the object 102 from which the radar signal 101 is reflected, based on the correction signal output in operation 540.

Figure 6:
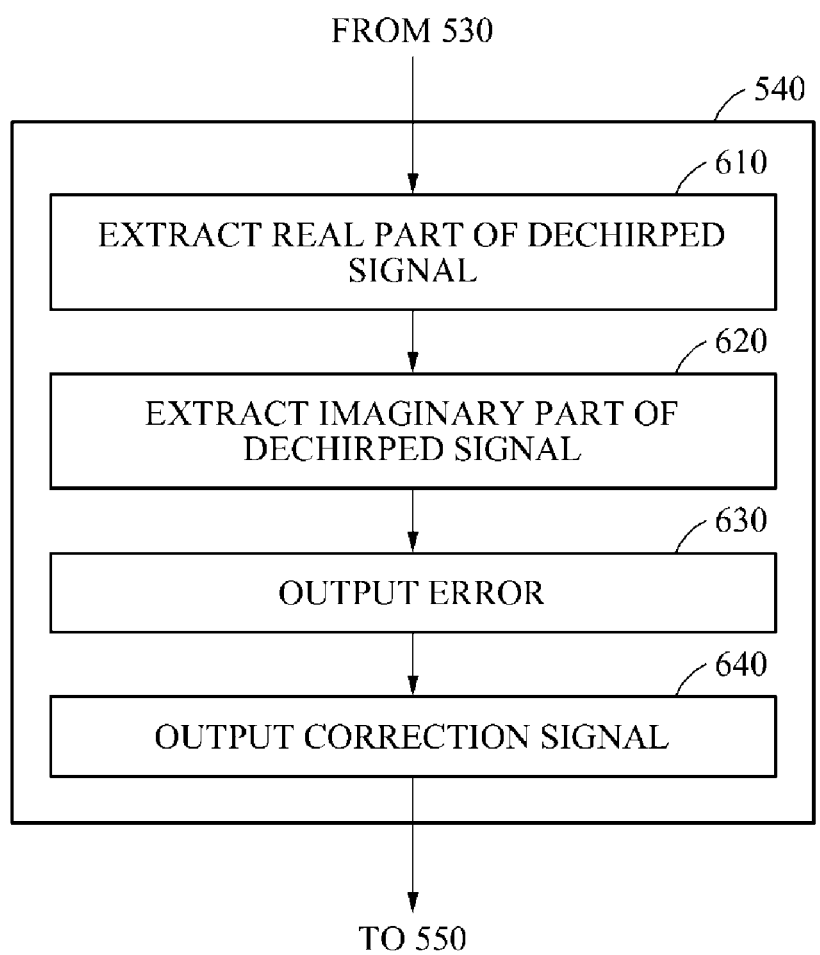
FIG. 6 is a flowchart illustrating a correction signal output procedure in a radar signal processing method according to an example embodiment of the present invention.

FIG. 6 is a flowchart illustrating a correction signal output procedure in a radar signal processing method according to an example embodiment of the present invention. In this example, operations 610 through 640 of FIG. 6 may be include in operation 540 of FIG. 5.

In operation 610, the real part extractor 210 may perform a conversion on an I channel signal of a converted signal $d_{IQ}(t)$ obtained by dechirping and filtering a radar signal in operation 530, thereby extracting a real part of the converted signal $d_{IQ}(t)$. The real part extractor 210 may convert the I channel signal based on, for example, a Hilbert transform.

The real part extractor 210 may perform a DFT on the I channel signal. The real part extractor 210 may determine a spectrum of the I channel signal based on the DFT result of the I channel signal. The real part extractor 210 may extract the real part of the converted signal $d_{IQ}(t)$ based on an inverse DFT result of the spectrum of the I channel signal.

In operation 620, the imaginary part extractor 220 may perform a conversion on a Q channel signal of the converted signal $d_{IQ}(t)$ obtained by dechirping and filtering the radar signal in operation 530, thereby extracting an imaginary part of the converted signal $d_{IQ}(t)$. In this example, the imaginary part extractor 220 may perform the DFT on the Q channel signal. The imaginary part extractor 220 may determine a spectrum of the Q channel signal based on a DFT result of the Q channel signal. The imaginary part extractor 220 may extract the imaginary part of the converted signal $d_{IQ}(t)$ based on an inverse DFT result of the spectrum of the Q channel signal.

In operation 630, the error extractor 230 may extract an error due to the I/Q imbalance based on the real part extracted in operation 610 and the imaginary part extracted in operation 620. For example, the error extractor 230 may extract the error due to the I/Q imbalance by multiplying a complex conjugate value of the real part and the imaginary part.

In operation 640, the correction signal generator 240 may output a correction signal obtained by compensating for the I/Q imbalance of the radar signal based on the error extracted in operation 630.

In this example, the correction signal generator 240 may output a Q channel of the correction signal by multiplying a complex conjugate value of the error and the imaginary part. Also, the correction signal generator 240 may output an I channel of the correction signal based on the real part.

According to an aspect of the present invention, it is possible to enhance an accuracy of a parameter for use in an object detection by correcting an error due to an I/Q imbalance of a radar signal in which the I/Q imbalance occurs.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A radar signal processing method comprising:
   receiving a radar signal reflected from an object;
   extracting a real part of the radar signal in which an in-phase/quadrature-phase (I/Q) imbalance occurs through a conversion of an in-phase (I) channel signal of the radar signal, wherein the real part includes an I channel and a Q channel;
   extracting an imaginary part of the radar signal through a conversion of a quadrature-phase (Q) channel signal of the radar signal, wherein the imaginary part includes an I channel and a Q channel;
   extracting an error due to the I/Q imbalance based on multiplying a complex conjugate of the I channel and the Q channel of the real part, and the I channel and the Q channel of the imaginary part;
   outputting a correction signal obtained by compensating for the I/Q imbalance of the radar signal based on the error; and
   detecting the object from which the radar signal is reflected based on the correction signal.

2. The method of claim 1, wherein the extracting of the real part comprises:
   performing a discrete Fourier transform (DFT) on the I channel signal;
   determining a spectrum of the I channel signal based on a DFT result of the I channel signal; and
   extracting the real part based on an inverse DFT result of the spectrum of the I channel signal.

3. The method of claim 1, wherein the extracting of the imaginary part comprises:
   performing a DFT on the Q channel signal;
   determining a spectrum of the Q channel signal based on a DFT result of the Q channel signal; and
   extracting the imaginary part based on an inverse DFT result of the spectrum of the Q channel signal.

4. The method of claim 1, wherein the outputting comprises:
   outputting a Q channel of the correction signal based on the error and the imaginary part; and
   outputting an I channel of the correction signal based on the in-phase (I) channel signal of the radar signal.

5. The method of claim 1, wherein the radar signal is filtered using at least one of a dechirping filter and a low pass filter.

6. A radar signal processing method comprising:
   receiving a radar signal reflected from an object;
   extracting an imaginary part of the radar signal through a conversion of a quadrature-phase (Q) channel of the radar signal;
   extracting an error due to an in-phase/quadrature-phase (I/Q) imbalance in the radar signal;
   outputting a correction signal obtained by compensating for the I/Q imbalance in the radar signal, wherein the correction signal includes a Q channel based on multiplying a complex conjugate of the error, and the imaginary part; and
   detecting the object from which the radar signal is reflected based on the correction signal.

7. The method of claim 6, wherein the outputting comprises:
   extracting a real part of the radar signal through a conversion of an in-phase (I) channel of the radar signal in response to the I/Q imbalance occurring in the radar signal, wherein the real part includes an I channel and a Q channel;
   extracting the error due to the I/Q imbalance based on the real part and the imaginary part, wherein the error includes an I channel and a Q channel; and
   generating the correction signal obtained by compensating for the I/Q imbalance in the radar signal based on the error.

8. The method of claim 7, wherein the extracting of the real part comprises:
   performing a discrete Fourier transform (DFT) on the I channel signal;

determining a spectrum of the I channel signal based on a DFT result of the I channel signal; and extracting the real part based on an inverse DFT result of the spectrum of the I channel signal.

9. The method of claim 7, wherein the extracting of the imaginary part comprises:

performing a DFT on the Q channel signal;

determining a spectrum of the Q channel signal based on a DFT result of the Q channel signal; and extracting the imaginary part based on an inverse DFT result of the spectrum of the Q channel signal.

10. The method of claim 6, wherein the outputting comprises:

outputting a Q channel of the correction signal based on the error and the imaginary part; and outputting an I channel of the correction signal based on the in-phase (I) channel signal of the radar signal.

11. The method of claim 6, wherein the detecting comprises:

defining an auto-correlation matrix based on the correction signal;

extracting a signal eigenvector matrix by applying an eigenvalue decomposition (EVD) to the auto-correlation matrix;

defining a signal sub-matrix based on the signal eigenvector matrix;

estimating a delay path of the radar signal based on the signal sub-matrix; and detecting the object from which the radar signal is reflected based on the delay path.

12. A radar signal processing apparatus comprising:

a real part extractor configured to extract a real part of a radar signal in which an in-phase/quadrature-phase (I/Q) imbalance occurs through a conversion of an in-phase (I) channel signal of the radar signal, wherein the real part includes an I channel and a Q channel;

an imaginary part extractor configured to extract an imaginary part of the radar signal through a conversion of a quadrature-phase (Q) channel signal of the radar signal, wherein the imaginary part includes an I channel and a Q channel;

an error extractor configured to extract an error due to the I/Q imbalance based on multiplying a complex conjugate of the I channel and the Q channel of the real part, and the I channel and the Q channel of the imaginary part; and a correction signal outputter configured to output a correction signal obtained by compensating for the I/Q imbalance of the radar signal based on the error.

13. The apparatus of claim 12, wherein the real time extractor is configured to perform a discrete Fourier transform (DFT) on the I channel signal, determine a spectrum of the I channel signal based on a DFT result of the I channel signal, and extract the real part based on an inverse DFT result of the spectrum of the I channel signal.

14. The apparatus of claim 12, wherein the imaginary part extractor is configured to perform a DFT on the Q channel signal, determine a spectrum of the Q channel signal based on a DFT result of the Q channel signal, and extract the imaginary part based on an inverse DFT result of the spectrum of the Q channel signal.

15. The apparatus of claim 12, wherein the correction signal outputter is configured to output a Q channel of the correction signal based on the error and the imaginary part and output an I channel of the correction signal based on the real part.

16. The apparatus of claim 12, wherein the radar signal is a signal generated based on a radar signal reflected from an object and filtered using at least one of a dechirping filter and a low pass filter.

17. The method of claim 1, wherein the conversion of the in-phase (I) channel signal of the radar signal is based on a Hilbert transform, and wherein the conversion of the quadrature-phase (Q) channel signal of the radar signal is based on another Hilbert transform.

18. The method of claim 6, wherein the conversion of the quadrature-phase (Q) channel signal of the radar signal is based on a Hilbert transform.

19. The apparatus of claim 12, wherein the real part extractor is further configured to use a Hilbert transform for the conversion of the in-phase (I) channel signal of the radar signal; and wherein the imaginary part extractor is further configured to use another Hilbert transform for the conversion of the quadrature-phase (Q) channel signal of the radar signal.

* * * * *